United States Patent [19]

Mann, Jr. et al.

[11] 4,427,432
[45] Jan. 24, 1984

[54] CLARIFICATION OF BLACK AMMONIUM POLYPHOSPHATE LIQUIDS—RECYCLING OF BYPRODUCT "TOPS"

[75] Inventors: Horace C. Mann, Jr., Killen; Kenneth E. McGill, Sheffield, both of Ala.

[73] Assignee: Tennessee Valley Authority, Muscle Shoals, Ala.

[21] Appl. No.: 407,526

[22] Filed: Aug. 12, 1982

Related U.S. Application Data

[63] Continuation of Ser. No. 232,926, Feb. 9, 1981, abandoned, which is a continuation of Ser. No. 194,304, Oct. 6, 1980, Pat. No. T100,805.

[51] Int. Cl.$^3$ .................................................. C05P 7/00
[52] U.S. Cl. .......................................... 71/34; 71/64.10; 71/42; 423/305
[58] Field of Search ........................... 71/34, 42, 64.10; 423/305, 310, 313; 210/729, 728, 705, 734, 735, 736

[56] References Cited

U.S. PATENT DOCUMENTS

| | | | |
|---|---|---|---|
| 3,630,711 | 12/1971 | Burkert et al. | 71/34 |
| 3,969,483 | 7/1976 | Stinson et al. | 423/305 |
| 4,157,911 | 6/1979 | Murphy et al. | 71/34 |
| 4,203,837 | 5/1980 | Hoge et al. | 210/705 |
| 4,246,248 | 1/1981 | McGill et al. | 423/305 |
| 4,354,943 | 10/1982 | Dorby | 423/305 |

*Primary Examiner*—Kenneth M. Schor
*Attorney, Agent, or Firm*—Robert A. Petrusek

[57] ABSTRACT

The process allows essentially all of the nitrogen and $P_2O_5$ values in the treated black ammonium polyphosphate liquid to be recovered in the form of valuable clarified product. In the process, a heel of black liquid fertilizer is first clarified by a prior-art procedure using flocculants. The improvement over the prior art picks up with the byproduct tops which is then diluted with the water of formulation required to dissolve additional amounts of ammonium polyphosphate melt. This diluted liquid is filtered, the filter cake containing upwards of 99 percent of the undesirable black carbonaceous material is discarded, and the clear filtrate, which contains essentially all of the nitrogen and $P_2O_5$ originally in the tops, is then used in lieu of the prior-art water of formulation to dissolve additional ammonium polyphosphate melt to produce more black ammonium polyphosphate liquid.

5 Claims, 1 Drawing Figure

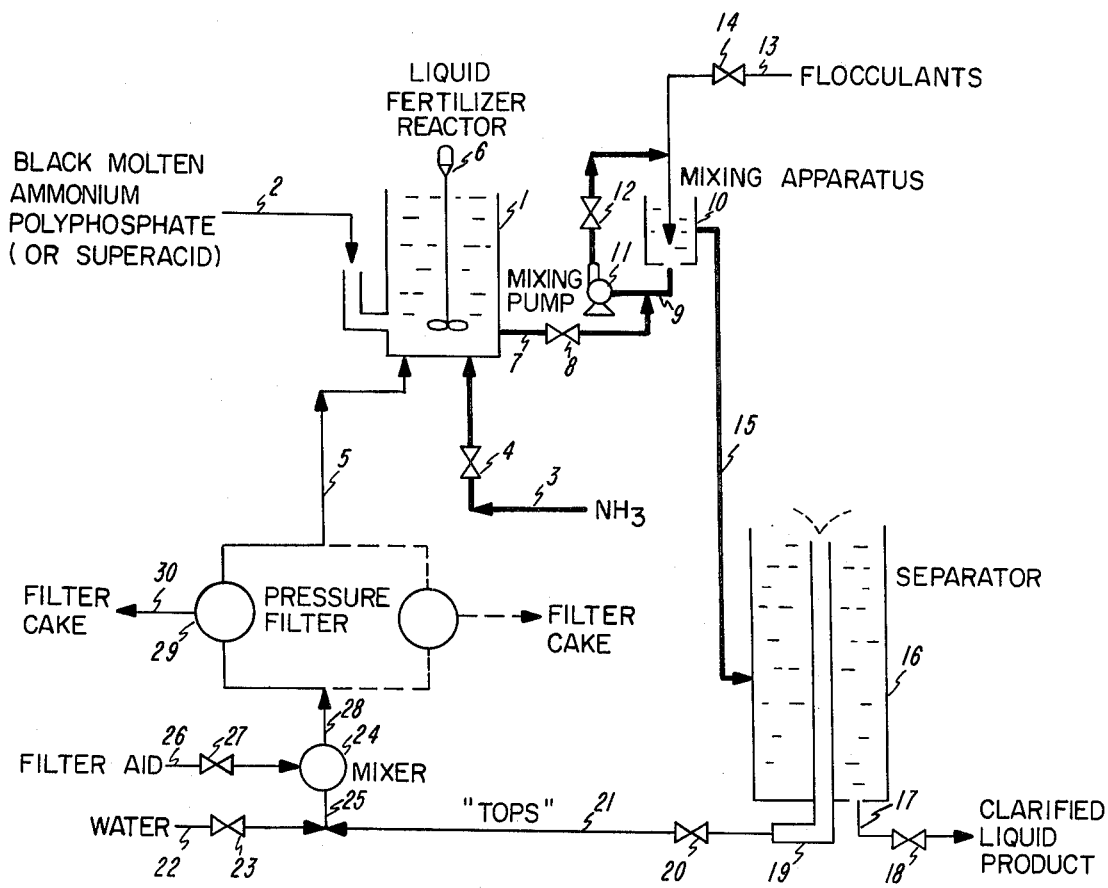

CLARIFICATION OF BLACK AMMONIUM POLYPHOSPHATE LIQUIDS—RECYCLING OF BYPRODUCT "TOPS"

The invention herein described may be manufactured and used by or for the Government for governmental purposes without the payment to us of any royalty therefor.

This is a continuation of copending application Ser. No. 232,926, filed Feb. 9, 1981 now abandoned and, which, in turn, is a continuation of application Ser. No. 194,304, filed Oct. 6, 1980, and published as Defensive Publication No. T100,805, July 7, 1981, both for CLARIFICATION OF BLACK AMMONIUM POLYPHOSPHATE LIQUIDS—RECYCLING OF BYPRODUCT "TOPS."

Our invention relates to a method for the removal of black particulate carbonaceous matter from black ammonium polyphosphate liquids made from impure wet-process phosphoric acids. More particularly, our invention relates to a new and improved method that allows recovery of essentially all of the black liquid as a clear liquid essentially free of particulate carbonaceous matter utilizing a process that involves flocculation of particulate carbonaceous matter with organic flocculants followed by separation of the clear liquid from the carbonaceous material. During this separation step, the particulate carbonaceous matter, a minor portion of the input ammonium polyphosphate liquid, and most of the flocculant are recovered as a mixture, hereinafter referred to for convenience as "tops." This mixture is then diluted with the water of formulation needed to make the starting black liquid, filtered, and the clear filtrate used as makeup water in the liquid fertilizer production step. By our procedure, essentially all the black liquid fertilizer fed to the clarification process can be recovered as clarified product, i.e., substantially all of the $P_2O_5$ values in the black liquid are recovered in the form of clarified solutions as contrasted by prior-art methods wherein only 80 to 90 percent of the $P_2O_5$ values are so recovered.

The method for production of phosphoric acid commonly practiced by the fertilizer industry, and referred to as the "wet process," involves reaction of impure phosphate rock with sulfuric acid. The reaction mixture is filtered to remove calcium sulfate and yields a very impure phosphoric acid that contains a wide variety of impurities. The acid has a concentration of about 30 percent $P_2O_5$ (filter-grade acid) when produced and is usually concentrated to a $P_2O_5$ content of about 54 percent (merchant-grade acid) prior to shipment. This concentration has the effect of increasing the proportion of impurities that are present.

The impurities in wet-process acid vary depending principally upon the composition of the phosphate rock used. Calcium sulfate and various compounds of iron, aluminum, magnesium, and fluorine are the most prevalent impurities. Organic compounds also are present; these comprise organic materials originally present in phosphate rock and organic chemicals used in beneficiation of the rock prior to acid extraction. A portion of the impurities are present in solid form and a portion of the impurities are soluble in the acid. Impurities precipitate from the acid during storage and transportation to the user.

The most prevalent form of rock used in this country in the production of wet-process acid is mined in Florida. The rock is not now calcined prior to extraction and merchant-grade acid made from uncalcined rock is dark in color-often black-due to the presence of soluble and insoluble organic compounds. Calcination is costly and unsuitable from the standpoint of conservation of energy since an expenditure of about 3 million Btu per ton of $P_2O_5$ is required.

Liquid mixed fertilizers having compositions similar to those of standard dry mixed fertilizers are well known in the industry and are increasing in popularity. Such solutions have the advantages over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers.

However, liquid fertilizers that contain all of their phosphorus values as ortho acyclic species have some outstanding disadvantages. The solutions are limited to a maximum plant food content of about 33 percent by weight because experience has taught that concentration in excess of this amount always has resulted in crystallization and precipitation of soluble salts. Furthermore, liquids that contain all of their phosphorus values as ortho acyclic species derived from phosphoric acid of the wet-process type contain precipitated metallic impurities originally present in said wet-process phosphoric acid. These disadvantages, in many instances, outweighed the benefits derived by elimination of the evaporation and bagging steps associated with solid fertilizers.

In a fairly recent breakthrough in overcoming the disadvantages of liquid mixed fertilizers produced by the prior-art methods, there is found in application Ser. No. 835,377,* John G. Getsinger, filed Aug. 29, 1959, the discovery that if phosphoric acid of the wet-process type containing up to a maximum of about 54 percent $P_2O_5$ is subjected to evaporating means, either at atmospheric or at reduced pressure, so as to condense the wet acid and raise its $P_2O_5$ content up to the range of approximately 60 to 76 percent $P_2O_5$, the formation of metallic precipitates which otherwise render wet-process phosphoric acid unusable for the preparation of liquid mixed fertilizers are substantially sequestered. In addition, there is taught in said application that if wet-process phosphoric acid is so concentrated, it may then be subsequently ammoniated to form liquid mixed fertilizers in which the metallic impurities originally present in said wet-process phosphoric acid remain sequestered and in solution. Substantially the same teachings wherein commercial grade wet-process phosphoric acid is concentrated and then subsequently ammoniated to form liquid mixed fertilizers is also found in U.S. Pat. No. 3,044,851, D. C. Young.

*now abandoned

Still another and more recent breakthrough in overcoming the disadvantages of the prior art enumerated supra is found in U.S. Pat. No. 3,382,059, Getsinger, wherein he produces liquid fertilizers from orthophosphoric acid of the wet-process type and ammonia wherein he circumvents or eliminates the separate heating and concentrating step found in his earlier referred to application and the disclosure of Young. In this later work, Getsinger has discovered that by combining orthophosphoric acid of the wet-process type and anhydrous ammonia in a direct method he is able to utilize the autogenous heat of reaction therein to effect the release of water from such acid whereby same is condensed while it is being ammoniated to form directly, without the separate heating and concentrating step, ammonium polyphosphate solutions.

In a more recent breakthrough (U.S. Pat. No. 3,775,534) Meline discovered that ammonium polyphosphate liquids that contained at least 80 percent of the phosphorus values as nonortho acyclic species may be produced by direct ammoniation of wet-process superphosphoric acid that contained at least some of the phosphorus values as the nonortho acyclic species.

As may be seen from the disclosures enumerated supra, it is now known in the art how to produce liquid mixed fertilizers having plant nutrient values comparable to many standard dry mixed fertilizers and, in addition, to the preparation of said liquid fertilizers by such means and in such forms as to substantially overcome many of the disadvantages originally inherent in the production of liquid fertilizers prior to the Getsinger disclosure. As may also be seen from a consideration of the economics involved, it is in many instances more highly desirable to produce such liquid mixed fertilizers by the ammoniation of wet-process superphosphoric acid rather than from the ammoniation of the cleaner, but more expensive, superphosphoric acid of the electric-furnace type.

However, with all the disclosures enumerated supra for the production of liquid fertilizers, a disadvantage still exists in the production of liquid fertilizer utilizing phosphoric acid of the wet-process type produced from the most prevalent source of phosphate rock in this country (uncalcined Florida phosphate). Due to the presence of soluble and insoluble organic matter, liquid fertilizers made from such acid are black in color. This coloration can mask the presence of any undesirable precipitated or suspended material in the liquid which can result in difficulties in application of the liquid.

The possible sources of organic matter in commercial wet-process phosphoric acids, include the naturally occurring organic matter derived from the rock (hydrocarbons, unsaturated fatty acids, and degraded porphyrins), as well as the conditioning agents (fatty acids, tallow amines) and collecting agents (hydrocarbon oils, kerosene) that are used during the beneficiation steps. As a group, these organic materials are relatively inert neutral compounds that fall into solubility classes $N_1$ and $N_2$ (Schriner and Fuson, *Identification of Organic Compounds*, 2nd Ed., John Wiley and Sons, New York, 1940), according to their solubility in reagent $H_3PO_4$. The neutral compounds that contain up to about 10 carbon atoms are soluble in reagent 80 percent $H_3PO_4$ (class $N_1$), whereas, the longer chain neutral compounds are not soluble (class $N_2$).

In merchant-grade wet-process acid, the insoluble organic matter is present principally as long-chain saturated fatty acids and waxy long-chain hydrocarbons. The soluble organic matter is of the same classes but of shorter chain length. On concentration of wet-process acid to the superphosphoric acid range (about 70 percent or more $P_2O_5$), significant amounts of the soluble short-chain organic matter is decomposed (charred) and polymerized with the result that an additional large amount of finely divided carbonaceous matter is formed that remains suspended in the acid or in ammonium polyphosphate liquids prepared from the acid. Further evidence of the partial decomposition (charring) and polymerization was shown by the retention of insoluble carbonaceous char in the equipment used in the identification study and the markedly greater hardness of the hydrocarbon waxes in comparison with those present in merchant-grade acid. The finely divided carbonaceous matter present in wet-process superphosphoric acid or in ammonium polyphosphate liquids produced from impure acids prepared from uncalcined phosphate rocks are extremely difficult to remove by filtration and settles at an extremely slow rate because of its small size.

It is an object of the present invention to produce improved ammonium polyphosphate liquid from the impure black liquid made with use of black phosphoric acid produced from impure phosphate rocks, such as uncalcined Florida rock. These improved ammonium polyphosphate liquids are clear and essentially free of insoluble carbonaceous matter, which clear liquids are in a form highly acceptable to the consumer, a characteristic heretofore obtained only by use of the essentially pure electric-furnace superphosphoric acid or the essentially carbonaceous-free acids made by use of calcined phosphate rocks. The insoluble particulate carbonaceous matter is removed from the black liquids by use of organic flocculating agents as will be described below.

Still further and more general objects and advantages of the present invention will appear from the more detailed description set forth below, it being understood, however, that this more detailed description is given by way of illustration and explanation only and not necessarily by way of limitation, since various changes therein may be made by those skilled in the art without departing from the true spirit and scope of the present invention.

The use of organic compounds per se for the clarification of wet-process acid or of ammonium polyphosphate solutions prepared from the acid is not unknown. Ittlinger (U.S. Pat. No. 3,129,170) describes a process for clarification of shipping or merchant-grade wet-process phosphoric acids that contain suspended solid metallic and organic impurities. The process comprises addition of an amine clarification agent to increase the settling rate of the impurities followed by separation of the clarified fraction.

Ittlinger points out that the impurities present comprise calcium, iron and aluminum phosphates, double salts of iron and aluminum phosphates with phosphoric acid, and also some organic compounds. He states that these impurities "upon standing in storage or during shipment in tank cars or the like . . . deposit a layer of solid matter which renders handling of the stored or shipped acid exceedingly difficult and frequently economically unfeasible." He apparently had no idea of the problems that arise because of the presence of finely divided carbonaceous chars and other matter that are formed on production of superphosphoric acid or ammonium polyphosphate from wet-process merchant-grade acids. He was not concerned with treatment of finely divided material which tended to remain suspended. Furthermore, clarification of wet-process phosphoric acid before it is processed into phosphatic solutions that contain polyphosphate is essentially useless with regard to eliminating the particulate black carbonaceous material since additional particulate carbonaceous material forms on heating to temperatures high enough to form polyphosphate. Therefore, to obtain a clear liquid phosphatic solution that is not black in color, clarification must occur after the polyphosphates are formed and at a low enough temperature not to degrade the flocculating agent before it has a chance to cause the black particulate carbonaceous material to float to the surface where it can be removed.

Burkert and Nickerson (U.S. Pat. No. 3,630,711) describe a process for removing black particulate carbonaceous matter from 10-34-0 grade ammonium polyphosphate liquids which involves combining 0.1 to 0.6 percent by weight of a water-insoluble aliphatic amine with the liquid and then allowing the particulate carbonaceous matter to flocculate and float as a froth to the surface. They state that in their pilot-plant operation they prefer to employ agitator apparatus and introduce air through an air sparger during the mixing. They further state that the amine residue coats the carbonaceous solids, collects the air bubbles and rises to the surface in a froth. The froth is separated from the underflow. To secure a high recovery of $P_2O_5$ values, the froth from the flotation step is diluted with water and refloated. Even then, Burkert et al allowed for the further step of filtering the product underflow. In column 3, line 8, they state, " . . . the underflow which may contain a small amount of suspended solids may be filtered through a filter cloth tied about the product outlet pipe. For such filtration, we have found Nylon, Dynel, cotton, and other fabrics to be very useful." In examples of their process wherein they recovered high proportions of the input 10-34-0 clarified product in short periods of time, they passed the treated liquid through a bag filter prior to the final cooling step.

Recently, Stinson et al (U.S. Pat. No. 3,969,483) utilized a combination of two flocculating agents, an aliphatic amine or aliphatic amine acetate and quaternary ammonium chloride, at addition rates significantly less than those utilized by Burkert et al, and obtained a synergistic effect thereby with the result that caused the black particulate carbonaceous matter to flocculate and rise rapidly to the surface of the liquid fertilizer solution. Furthermore, by use of the combination of the organic flocculating agents, the entire clarification process was simplified by Stinson et al into one single separation stage instead of two or more stages (one or two separation stages and a filtering step) as described in U.S. Pat. No. 3,630,711, supra, without sacrifice of the recovery of clarified liquid fertilizer.

Stinson et al have made valuable and significant contributions to the state of the art. However, our invention is an improvement over the process developed by Stinson et al in that it allows essentially total recovery of the $P_2O_5$ as valuable clarified product and decreases significantly the problems associated with disposal of the relatively large amount of less valuable tops that is produced. Our process also simplifies both the process and equipment of Burkert et al in that we do not employ an air sparger to introduce air bubbles, nor do we need another separation vessel and its auxiliary equipment to effect improved recoveries of clarified product. In our separation process, we obtain the same high recoveries from the separator that were obtained by Stinson et al, but then by diluting the tops with the water normally fed to the liquid reactor, we are able to remove the particulate carbonaceous material from the tops at relatively high filtration rates and then by returning the recovered $P_2O_5$ to the liquid fertilizer reactor we are able to obtain essentially total recovery of the valuable $P_2O_5$ as clarified liquid fertilizer. In contrast, in the Burkert and Nickerson process they must dilute and refloat to obtain high recoveries and although they do not specifically point out any problems, they must have a problem of disposal of the diluted material from the second refloat step which we do not encounter. The very small amount of solid filter cake that we produce can be used as low-grade fertilizer or used as a filler in the manufacture of solid fertilizers while the valuable $P_2O_5$ we recover is included in the clarified liquid fertilizer which is in a concentrated form and could not be differentiated from the original clarified product.

The novelty of our process is in recognizing that diluting the tops with water increases the filtration rate to a practicable level and realizing that there is sufficient water available within the process to obtain a significant dilution of the tops.

Our invention, together with its desired objectives and further advantages thereof, will be better understood from a consideration of the following description taken in connection with the accompanying drawings in which:

The FIGURE is a flowsheet illustrating principles of our novel process.

Referring now more specifically to the FIGURE, the black molten ammonium polyphosphate (or black superphosphoric acid) from a source and means of control not shown is fed to liquid fertilizer reactor 1 via line 2 along with ammonia, when required, from a source not shown, via line 3 and means for control 4. Also fed to liquid fertilizer reactor via line 5 is "tops" that had first been diluted with the water required for formulation of the black liquid and filtered. Mixing of the ammonium polyphosphate, ammonia, and diluted and filtered tops in liquid fertilizer reactor 1 is accomplished with any suitable means for agitation and mixing; one type of mixer is illustrated as mixer 6. Control of the temperature in liquid fertilizer reactor 1 is accomplished with cooling coils which are not shown and means for introducing and controlling the flow of cooling medium such as water, which also is not shown. Other types of coolers, of course, also could be employed. The black liquid fertilizer of the desired pH and concentration is withdrawn from liquid fertilizer reactor 1 via line 7 and means for control 8, and passes into recirculation line 9, which is a part of a mixing apparatus used to mix the flocculants with the black liquid fertilizer. One type of mixing apparatus is composed of mixing reservoir 10 and pump 11, which recirculates the black liquid through the mixer reservoir 10 and provides the mixing action required to combine the flocculants with the black liquid fertilizer. Other types of mixers, such as agitators, can be used as long as they provide the equivalent amount of mixing. The amount of flow through mixing pump 11 may be controlled by valve 12 in recirculation line 9. The flocculants from a source not shown are fed into mixer recirculation line 9 via line 13 and means of control 14. Alternatively, the flocculants and black liquid fertilizer may be mixed in reservoir 10 by any suitable means, for example, a high-speed agitator, which is not shown. Also, another alternative is the addition of the flocculants to liquid fertilizer reactor 1. This could be accomplished with mixing pump 11 by adding the flocculants into recirculation line 9, which would then discharge directly into liquid fertilizer reactor 1 instead of mixer reservoir 10. The flocculated black liquid fertilizer then discharges from mixing apparatus 10, 11 via line 15 into separator 16 where the flocculated carbonaceous material separates from the clarified product.

The clarified liquid product is withdrawn from separator 16 via line 17 and means for control 18 into suitable storage vessels, not shown, for subsequent sales.

Separator 16 may be operated either continuously or on a batch basis as may the remainder of the equipment. The black carbonaceous material floats to the top of separator 16 and overflows from the top thereof. One method of removing the carbonaceous material is to allow it to overflow into a central standpipe line 19 through means for control 20 and into line 21. Water is fed from line 22 through means for control 23 and both the water and the tops are fed to mixer 24 via line 25 along with sufficient filter aid from a source not shown via line 26 and means for control 27. All of this mixture is pumped by any suitable means not shown via line 28 to filter system 29 in which the carbonaceous matter and filter aid is separated from the liquid fertilizer. The filter aid and carbonaceous matter are discharged from filter system 29 via line 30. The filtrate is fed via line 5 to the liquid fertilizer reactor 1 and reused.

DESCRIPTION OF THE PROCESS

The black liquid fertilizer of pH between 5.5 and 6.5 to be clarified is mixed with the proper amount of flocculants and this mixture is then discharged into a separation vessel where the particulate black carbonaceous material floats to the surface along with essentially all of the flocculants. The clarified liquid that is essentially free of particulate carbonaceous material is withdrawn from the bottom of the vessel and sent to storage.

The tops continuously overflows from the separator and is mixed with water and diatomaceous filter aid and is fed at a controlled rate into a batch-type filter. The filter cake is removed and the clarified dilute filtrate is fed back to the liquid fertilizer reactor. The filtration operation can be run continuously as shown in the FIGURE, where two filters would be used so that one would be in operation while the alternate unit was being cleaned and prepared for operation. However, batch operation may be used if it is more suitable for operation.

The above method of operation is an example of one way that the process can be carried out and is not intended to limit the possible other methods that would also result in overall separation of the black particulate carbonaceous material from liquid fertilizer.

The flocculants and proportions used in the clarification step are the same as those used by Stinson et al in U.S. Pat. No. 3,969,483. One of the flocculants tested was a primary aliphatic tallow amine with the major component being $C_{18}H_{35}NH_2$. It also contains a significant amount of amine with chain lengths of 16 carbon atoms, and as shown in the following typical chain length distribution data furnished by the manufacturer (Armak Chemicals, Division of Akzona, Inc.) contained no measurable amounts of amines with chain length in excess of 18 carbon atoms. This material is referred to by the manufacturer as Armeen T. Armeen T is derived from tallow and contains all the chain lengths found in tallow from $C_{12}$ through $C_{20}$; the $C_{12}$ and $C_{20}$ are in trace amounts. Unsaturates in the amine will be different from the tallow because hydrogenation will convert some to the saturated component.

| Typical Chain Length Distribution (as determined by gas chromotography) | | | |
|---|---|---|---|
| Saturated | % by wt. | Unsaturated | % by wt. |
| Caproyl C-6 | — | Myristoleyl C-14' | 1.0 |
| Caprylyl C-8 | — | | |
| Capryl C-10 | — | Palmitoleyl C-16' | 3.0 |
| Lauryl C-12 | 1.0 | | |
| Myristyl C-14 | 3.0 | Oleyl C-18' | 37.0 |
| Pentadecyl C-15 | 0.5 | | |
| Palmityl C-16 | 29.0 | Linoleyl C-18' | 1.5 |
| Margaryl C-17 | 1.0 | | |
| Stearyl C-18 | 23.0 | | |

Another flocculant tested was a quaternary ammonium chloride which is di(hydrogenated) dimethyl ammonium chloride compound and is reported by the manufacturer (Armak Chemicals, Division of Akzona, Inc.) to contain longchain hydrocarbons in which the clain lengths vary primarily from 16 to 18 carbon atoms in length; a typical chain length analysis of the major components furnished by the manufacturer showed 24 percent hexadecyl, 75 percent octadecyl, and 1 percent octadecenyl. There are small amounts of $C_{12}$, $C_{14}$, $C_{15}$, $C_{17}$, $C_{20}$, etc., present. This flocculant is referred to by the manufacturer as Arquad 2HT-75.

Other manufacturers produce similar flocculants and refer to them by other designations.

One flocculant, an acetic salt of an aliphatic amine, may be utilized as a replacement for the aliphatic tallow amine. The acetate salt reported by the manufacturer (Armak Chemicals, Division of Akzona, Inc.) mostly contains from 16 to 18 carbon atoms. A typical chain length analysis furnished by the manufacturer shows 25 percent of hexadecyl, 72 percent of octadecyl, and 3 percent of octadecenyl and is referred to as Armac HT.

The filter aid tested was a flux calcined diatomite which is derived from sedimentary rock composed of the skeletal remains of single-celled aquatic water plants. Typical physical and chemical properties on the filter aid are shown in the following tabulation as furnished by the manufacturer. The filter aid is commercially available and is used in commercial filtration units and is referred to by the manufacturer as Hyflo Super-Cel.

| Typical Properties of a Flux Calcined Diatomaceous Filter Aid | |
|---|---|
| Physical | |
| Color | White |
| Density, lb/ft³ | |
| Dry | 9.0 |
| Wet | 17.2 |
| Screen analysis, % retained on 150 mesh | 9.5 |
| pH | 10.0 |
| Specific gravity | 2.3 |
| Water absorption | 245 |
| Chemical | |
| Ignition loss, % | 0.2 |
| Analysis, % by wt. | |
| $SiO_2$ | 89.6 |
| $Al_2O_3$ | 4.0 |
| $Fe_2O_3$ | 1.5 |
| $P_2O_5$ | 0.2 |
| $T_1O_2$ | 0.2 |
| CaO | 0.5 |
| MgO | 0.6 |
| $NaO + K_2O$ | 3.3 |

In order that those skilled in the art may better understand how the present invention can be practiced, the following examples are given by way of illustration and not necessarily by way of limitation.

EXAMPLES

For the sake of convenience and to more clearly illustrate the principles and concepts relating to our invention, we have grouped our test results in two main categories and presented same below as Examples I and II. The data and test results, as well as the description found in Example I infra, relate to certain procedures we followed in preparing representative sources of tops, which sources were subsequently utilized in the second group of tests listed below as Example II, which second group of tests relate principally to the steps in our process revolving about the area of filtration of the tops, it being understood that an underlying concept of the instant invention is the discovery of ways and means for ridding the system of the unwanted carbonaceous material after it has been separated from the previously black liquid fertilizer solution in a manner such that, at the most, only negligible amounts of nitrogen and $P_2O_5$ values originally present in said black fertilizer solutions are discarded or removed from the system with said black carbonaceous byproduct.

EXAMPLE I

As noted above, in this series of tests comprising this example, the emphasis was on producing a batch of tops representative of byproduct material that has been produced from a variety of acids in prior clarification studies. The tests were made in equipment which consisted essentially of a pipe reactor and a liquid fertilizer reactor for preparation of black 11-37-0, a mixer with recirculation pump for mixing flocculant with the 11-37-0, and a settling vessel (separator) for separation of the tops from clear 11-37-0. The process was carried out essentially as shown in the FIGURE, supra.

In production of the liquid fertilizer (Table I, infra), black wet-process superphosphoric acid was heated to 200° F. and then fed to the pipe reactor along with sufficient ammonia to give a final liquid pH of about 6. The pipe reactor was constructed of 1-inch pipe in the shape of an inverted U; it was 11 feet in length. Maximum pipe reactor temperature was 645° F. The molten ammonium polyphosphate produced in the pipe discharged beneath the surface in the liquid fertilizer reactor. Sufficient water was added to the liquid reactor to give a liquid with a density of about 1.4 grams per milliliter, which corresponds to a grade of 11-37-0. The liquid in the reactor was maintained at about 180° F. by circulating the black liquid through the tubes of a water-cooled shell-and-tube-type heat exchanger. The liquid production rate was approximately 1 ton of 11-37-0 per hour.

[1] Acid produced by Company A; analysis shown in Table I.

The product liquid contained 11.0 percent N and 37.7 percent $P_2O_5$ with 82 percent of the $P_2O_5$ as polyphosphate and was cooled to about 80° F. and stored.

Subsequently, the black liquid was reheated to 125° F. and clarified to obtain tops for evaluation of the best filtration procedure to use. In the clarification run (Table II, infra) the black liquid was fed at a rate of about 1 ton per hour to the liquid-flocculant mixer. The mixer was an 8-inch-diameter by 24-inch-high vessel coupled to a 100-gallon-per-minute centrifugal pump. The flocculants, an aliphatic amine and a quaternary ammonium chloride, are pastes at room temperature. They were mixed in a 1:1 weight ratio, melted (125° F.), and fed by metering pump to the mixer. The total amount of the combined flocculant used was 2 pounds per ton of black 11-37-0. Liquid was withdrawn from the bottom of the mixer through the open-impeller centrifugal pump and recirculated a number of times to provide the mixing to cause flocculation. The retention time in the mixer was about 2 minutes and the mixture passed through the pump about 35 times.

The mixtures of 11-37-0 and flocculant (125° F.) overflowed by gravity from the mixer to a cylindrical separator (45-inch-diameter by 44-inch-high) with a flat bottom. Retention time and temperature in the separator was 110 minutes and 125° F., respectively. Feed rate to the separator was equivalent to 179 pounds per hour per square foot of separator surface area. The clarified liquid was pumped from the bottom of the separator at controlled rates through a heat exchanger where it was cooled to about 85° F. before it went to a collection vessel. The black tops portion was moved to the center of the separator by an S-shaped scraper blade and was discharged through a 2-inch "standpipe." The tops then was pumped through a heat exchanger where it was cooled to about 85° F. and then to a collection vessel.

In this clarification test, the depth of tops in the settler remained at about 17 to 19 inches while withdrawing clarified 11-37-0 at rates equivalent to 83 percent of the feed 11-37-0. The proportion of clarified liquid obtained was controlled by adjusting the rate at which the clarified 11-37-0 was pumped from the separator.

Clear, green liquid fertilizer with acceptable clarity (48–58 percent light transmittance at 560 nanometer wavelength) and with essentially no carbonaceous matter present was obtained in the test. Analyses of the tops and clarified product were essentially the same (11 percent N; 37–38 percent $P_2O_5$). From 97 to 99 percent of the water-insoluble solids, presumed to be principally carbonaceous material, was present in the tops.

TABLE I

Production of Black 11-37-0 Liquid Fertilizer by the Pipe-Reactor Process

| Test No. | LSC-1 |
|---|---|
| Length of test, hr | 27.9 |
| Pipe reactor[a] | |
| Superphosphoric acid[b] fed | |
| Rate, lb/hr | 1100 |
| Ton/(hr)(ft³ reactor volume) | 9 |
| Temperature, °F. | 196 |
| Anhydrous ammonia fed | |
| Temperature, °F. | 127 |
| Rate, lb/hr | 158 |
| Temperature, °F. | 645 |
| Liquid fertilizer reactor | |
| Temperature, °F. | 150 |
| $H_2O$ fed, lb/hr | 614 |
| Anhydrous ammonia fed, lb/hr | 106 |
| Reactor discharge | |
| Grade | 11.0-37.7-0 |
| % of total $P_2O_5$ as polyphosphate | 82 |
| Density, g/ml, at 80° F. | 1.4 |
| pH | 6.2 |
| Rate, lb/hr | 1978 |

[a] Pipe reactor constructed in the shape of an inverted "U" of 1-inch stainless steel pipe 11 feet in total length.
[b] Source and composition of the feed acid is described below:

| | Composition, % by wt. | | | | | % of |
|---|---|---|---|---|---|---|
| Source | Total $P_2O_5$ | $Fe_2O_3$ | $Al_2O_3$ | F | MgO | total $P_2O_5$ as polyphosphate |
| Company A | 67.8 | 1.4 | 1.0 | 0.39 | 0.47 | 21 |

TABLE II

Clarification of Black 11-37-0[a] in Pilot-Plant Equipment

| Test No., CLP- | 10/5 |
|---|---|

TABLE II-continued

Clarification of Black 11-37-0[a] in Pilot-Plant Equipment

| | |
|---|---|
| Length of test, hr | 6.5 |
| Mixer | |
| Black liquid fertilizer | |
| Feed rate, lb/hr | 1970 |
| Temperature, °F. | 125 |
| Flocculant | |
| Designation[b] | ATA QAC |
| Rate, lb/ton fertilizer | 1.0 1.0 |
| Temperature, °F. | 125 |
| Operating conditions | |
| Temperature, °F. | 125 |
| Retention time, min | 2.3 |
| Mixing pump (impeller tip speed, 92 ft/sec) | |
| Rate, gal/min | 98 |
| Number of passes through mixing pump | 36 |
| Liquid velocity, ft/sec. through recirculation line | 21 |
| Reynolds No. ($N_{Re}$) through vertical pipe entering mixer | 3900 |
| Separation Vessel | |
| Diameter, inches | 45 |
| Distributor location, inches below liquid surface | 10 |
| Operating conditions | |
| Skimmer rotation speed, rpm (tip speed, ft/min) | 0.33(3.9) |
| Retention time, min | 110 |
| Feed rate, lb/(hr)(ft$^2$) | 179 |
| Temperature, °F. | 125 |
| Total liquid height, inches | 44 |
| Carbonaceous material depth, inches at start-end of test period | 17-19 |
| Overflow ("tops" containing carbonaceous material) | |
| Discharge rate, av., lb/hr | 335 |
| Temperature, °F. (after cooler) | 87 |
| Composition | |
| Grade | 11.1-37.7-0 |
| % of total P$_2$O$_5$ as polyphosphate | 74.5 |
| Underflow (clarified "product" liquid) | |
| Discharge rate, av., lb/hr | 1635 |
| Recovery of 11-37-0, % of input | |
| Range | 81-89 |
| Average | 83 |
| Clarity, % of transmittance[c] | |
| Range | 48-58 |
| Average | 54 |
| Temperature, °F. (after cooler) | 85 |
| Composition | |
| Grade | 11.2-38.0-0 |
| % of total P$_2$O$_5$ as polyphosphate | 73.9 |
| pH | 6.0 |
| Density, g/ml, at 80° F. | 1.454 |
| Viscosity, cP, at 80° F. | 132 |

[a] Liquid (11.2-37.9-0; 74.7% polyphosphate) was made from superphosphoric acid produced by Company A.
[b] ATA indicates aliphatic tallow amine; QAC indicates quaternary ammonium chloride.
[c] Liquid clarity determined with a Bausch and Lomb Spectronic 20 colorimeter equipped with ½-inch-diameter sample container. Light transmitted at 560 nanometers; distilled water used as standard and colorimeter dial adjusted so that 100% (scale reading of 100) of transmitted light passed through sample of water.

EXAMPLE II

It should be noted that the amount of black carbonaceous material that we are removing is quite small in proportion to the amount of liquid phase present in the byproduct tops, plus the water of formulation that will be combined with the tops and after filtration returned to the liquid fertilizer reactor. As shown in the prior art (Stinson '483, column 12, about lines 45 to 50), the water-insoluble solids, which is considered to be primarily the particulate black carbonaceous material in the liquid fertilizers, was determined and found to range from about 0.2 to about 0.4 percent by weight in the black liquid fertilizer, which percentage is equivalent to 4 to 6 pounds of solids per ton of liquid fertilizer. The water of formulation used in making the black liquid fertilizer described in Table I was equivalent to 614 pounds per hour; the residual liquid fertilizer in the byproduct tops was in the neighborhood of 300 pounds per hour; combining the water of formulation and residual fertilizer will give a total liquid phase of around 900 pounds in which the 4 to 6 pounds of black carbonaceous material would be present. Thus, it is obvious that the amount of solids that must be removed by filtration is quite small in relation to the amount of liquid present. Also, it is indicative of how only a very small amount of black carbonaceous material can render an otherwise valuable fertilizer solution an almost unmarketable product. Subsequent studies shown in this example were carried out to determine the optimum filtration rates and cycle times that will be required in larger scale equipment to remove this particulate black carbonaceous material from the tops.

Portions of some of the tops produced according to Example I, supra, were first filtered in various ways to define the method of operation that would give the highest filtration rate. For convenience, filtration of the tops was carried out semicontinuously in a laboratory-scale pressure filter. The tops represented between about 15 and 20 percent by weight of the input black 11-37-0 made from superphosphoric acid from Company A. Portions of the tops were filtered undiluted; others were diluted with the amount of water (1.9 lb water/lb tops, or 33 percent by weight of the liquid fertilizer) normally added in the liquid fertilizer reactor during production of 11-37-0 and then filtered. This degree of dilution resulted in filtrate of 3.9-13.0-0 grade. For comparison, filtration tests were made also on the starting black 11-37-0. Results from these tests are shown in the following tabulation and indicated that the filtration rates of both the undiluted tops and the black 11-37-0 feed to the flocculation process were about the same and appeared too low to be practical. (See Stinson et al, '483 supra, column 4, lines 23-28.) However, when the tops was diluted with the water of formulation before filtering, the filtration rate was about doubled (on P$_2$O$_5$ basis) at most cycle times and was high enough to be practical.

| | Tops | Diluted tops | Black 11-37-0 |
|---|---|---|---|
| Unfiltered liquid grade | 11.0-37.7-0 | 3.9-13.0-0 | 11.1-37.9-0 |
| Liquid filtration rate,[a] gal/(hr) (ft$^2$), after indicated cycle time | | | |
| 1 hr | 0.6(2.7)[b] | 5.0(6.1)[b] | 0.8(3.6)[b] |
| 3 hr | 0.5(2.3) | 2.7(3.3) | 0.4(1.8) |
| 5 hr | 0.2(0.9) | 2.1(2.5) | 0.3(1.4) |
| 8 hr | 0.2(0.9) | 1.6(1.9) | 0.1(0.5) |

[a] Calculated by extrapolation of data in batch (constant pressure of 20 psig) tests.
[b] Numbers in parentheses are lb P$_2$O$_5$/(hr) (ft$^2$).

Filtration tests were then carried out in a bench-scale pressure filter (3-inch-diameter by 4-inch-high pressure filter; 0.05-ft$^2$ filter area) to determine filtration rates and cycle times that might be expected in large-scale equipment. In making a test, the polypropylene filter cloth[1] was precoated with 10 pounds of diatomaceous filter aid[2] per 100 sq. feet of filter area. Also, 0.15 percent by weight of this same filter aid was premixed with the liquid to be filtered. The liquid containing the filter aid was either loaded into the filter before the test was begun (batch tests) or pumped into the filter throughout the test (semicontinuous tests). The batch tests were made at a constant pressure of 20 psig. The semicontinuous tests were made at a constant feed rate to the filter;

thus, pressure increased throughout the test. The amount of filtrate obtained was measured at intervals of 1 to 5 minutes during 8- to 181-minute test periods and volumes of filtrate obtained were plotted versus time on log-log paper; the data were extrapolated graphically to predict the filtration rates at longer periods (1, 3, 5, and 8 hours). The constant-pressure tests were made in a Plexiglas filter, but the constant-rate tests were made in a stainless steel filter to allow operation at higher pressures; both filters are identical in size. Results from the tests are shown in Table III, infra. The filtrates were green in color with a clarity of 54 to 70 percent light transmittance as shown in Table III, infra.

[1] Monofilament cloth obtained from Company B.
[2] Produced by Company C.

Based on the filtration rate used in the constant-rate test, a 700-square-foot pressure leaf filter would filter the tops produced (607 gal tops/hr or 2114 gal diluted tops/hr) from a 20-ton-per-hour clarification unit. If a filter of this size had 3-inch spacing between the leaves, results of the test indicate that the volume of filter cake formed would require the filter to be cleaned every 6 hours. With a 4-inch leaf spacing, the time could be extended to 8 hours, assuming that pressure within the filter did not exceed the working pressure of the filter; a typical working pressure is 75 psig. The total cost[1] of the filter aid used would be ninety cents per ton of tops, or $2.39 per ton of $P_2O_5$ recovered from tops. Distributed onto the cost of the total clear 11-37-0 produced in

TABLE III

| Filtration of Liquid Fertilizers Containing Carbonaceous Materials | | | | |
|---|---|---|---|---|
| Type of filtration operation | ← Constant pressure[a] → | | | ← Constant rate[b] → |
| Liquid to filter | "Tops" | Water:tops ratio 1.94 | Black 11-37-0 | Water:tops ratio 1.94 |
| Grade | 11.0-37.7-0 | 3.9-13.0-0 | 11.1-37.9-0 | 3.9-13.0-0 |
| Liquid temperature, °F., at filter inlet/outlet | 80/80 | 80/80 | 80/80 | 80/80 |
| Filter aid | | | | |
| Precoat, lb/100 ft² filter area | 10 | 10 | 10 | 10 |
| Admix in feed to filter, % by wt. | 0.15 | 0.15 | 0.15 | 0.15 |
| Filtration results | | | | |
| Operating time, min | 20 | 8 | 30 | 181 |
| Cake thickness, in[c] | 1/16, 1/16 | 1/16, 2/16, 1/16, 1/16 | 1/16, 9/16 | |
| Filtrate | | | | |
| Volume (total collected), ml | 62 | 391 | 124 | 1849 |
| Clarity[d] after indicated filtration time | | | | |
| Start | 0 | 0 | 0 | 0 |
| 1 min | — | 82 | 0 | 82 |
| 3 min | — | 85 | — | 82 |
| 5 min | — | 84 | 7 | 82 |
| 10 min | 64 | — | 15 | 82 |
| 20 min | 70 | — | 30 | 82 |
| 30 min | — | — | 54 | 83 |
| End | 70 | 84 | 54 | 83 |
| Average rate,[e] gal/(hr) (ft²), after indicated filtration time | | | | |
| 1 hr | 0.6(2.7)[f] | 5.0(6.1)[f] | 0.8(3.6)[f] | 3.1(3.8)[f] [1/2 psig] |
| 3 hr | 0.5(2.3) | 2.7(3.3) | 0.4(1.3) | 3.2(3.9) [4 psig] |
| 5 hr | 0.2(0.9) | 2.1(2.5) | 0.3(1.4) | — |
| 8 hr | 0.2(0.9) | 1.6(1.9) | 0.1(0.5) | — |
| Cubic feet cake[g] gal liquid | — | 0.0050 | — | 0.0048 |

[a] About 400 ml of black liquid plus filter aid was charged to the pressure filter which was then sealed. The pressure in the filter (20 psig) was maintained by air pressure.
[b] Unfiltered liquid was fed at a constant rate to the pressure filter. The pressure in the filter is shown in brackets.
[c] First number, precoat thickness; second number, total cake thickness at end of test.
[d] Liquid clarity determined with a Bausch and Lomb Spectronic 20 colorimeter equipped with ½-inch-diameter sample container. Light transmitted at 560 nanometers; distilled water used as standard and colorimeter dial adjusted so that 100% (scale reading of 100) of transmitted light passed through sample of water.
[e] Calculated by extrapolation of data in constant-pressure tests.
[f] Numbers in parentheses are lb $P_2O_5$/(hr)(ft²).
[g] Does not include volume of precoat The constant-rate test made with the diluted tops was of value since from this test the length of time a filter could be operated before the leaves had to be cleaned could be estimated. The maximum operating time on any leaf filter is governed by the working pressure of the filter and the volume of space between the filter leaves. In this constant-rate test, the filtration rate used [about 4 lb $P_2O_5$/(hr)(ft²) or 3 gal of diluted tops/(hr)(ft²)] was about that obtained after 3 hours in the constant-pressure test. The test was run for about 3 hours and arbitrarily ended. The pressure had only built up to 4 psig; about 0.5 psig pressure was noted on the filter after the first hour of filtration. The total cake thickness was 9/16 inch (initially 1/16 in) which was equivalent to 4.8 cubic feet of cake formed per 1000 gallons of liquid. The filtate was amber in color and had a very high clarity (82–83 percent light transmittance). After storage for 3 weeks, no carbonaceous flocs appeared in the liquid.

the flocculation-flotation process, the filter aid cost would be only about 40 cents per ton of $P_2O_5$.

[1] Cost of filter aid of $150 per ton (delivered to Muscle Shoals, Ala.)

The operation envisioned would be continuous, as shown in the FIGURE. For true continuous operation, two filters would be necessary so that one would be in operation while the alternate unit was being cleaned and precoated. About 12,100 gallons (6-hr cycle) to 18,200 gallons (8-hr cycle) of tops (including water of dilution) could be filtered before the filters would have to be alternated.

A material balance made on this process based on a production and clarification rate of 1 ton of clarified product is summarized in Table IV below. The balance shows that essentially all the nitrogen and more than 99 percent of the $P_2O_5$ is recovered.

TABLE IV

| Item | Lb N | Lb $P_2O_5$ |
|---|---|---|
| Input | | |

TABLE IV-continued

| Item | Lb N | Lb P$_2$O$_5$ |
|---|---|---|
| 1064 lb W.P. super acid | 0 | 745 |
| 272 lb NH$_3$ | 224 | 0 |
| 681 lb H$_2$O | 0 | 0 |
| 3 lb flocculant | 0 | 0 |
| 5 lb filter aid | 0 | 0 |
| Output | | |
| 2000 lb 11-37-0 | 224 | 744 |
| 25 lb filter cake | Trace | 1 |

After sifting and winnowing through the data and results of the tests and operations of our new and improved clarification process where we recognize that essentially total recovery of the P$_2$O$_5$ as valuable clarified product can be obtained, we now present the operating and preferred ranges of the variables in our process in Table V below.

TABLE V

| Process variable | Operating range | Preferred range |
|---|---|---|
| Liquid Fertilizer Reactor | | |
| Temperature, °F. | 140–200 | 150–180 |
| Retention time, min | 15–60 | 20–30 |
| Anhydrous ammonia Temp., °F. | 60–200 | 80–100 |
| Molten ammonium polyphosphate$^a$ Temp., °F. | 500–700 | 600–550 |
| Superphosphoric acid$^a$ Temp., °F. | 60–250 | 150–200 |
| Concentration, % P$_2$O$_5$ by wt. | 68–72 | 68–70 |
| Liquid from filter Grade | 0.7-2-0 to 4-13-0 | 1-4-0 to 4-13-0 |
| Discharge (feed to mixing apparatus) Grade | 8-24-0 to 11-37-0 | 10-34-0 to 11-37-0 |
| Polyphosphate level, % of total P$_2$O$_5$ | 45–90 | 50–80 |
| pH | 5.5–7.0 | 6.0–6.6 |
| Mixing Apparatus | | |
| Flocculant | | |
| Temp., °F. | 32–180 | 80–130 |
| Lb primary amine/ton liquid fertilizer | 0$^b$–1.5 | 1–1.5 |
| Lb acetic acid salt of primary amine/ton liquid fertilizer | 0$^b$–1.5 | 0–1.5$^b$ |
| Lb quaternary ammonium chloride/ton liquid fertilizer | 0.1–1.5 | 1.0–1.5 |
| Temperature, °F. | 100–180 | 120–150 |
| Retention time, min. | 1–5 | 2–3 |
| Mixing pump | | |
| Impeller tip speed, ft/sec | 25–130 | 35–125 |
| No. of passes of liquid through pump | 20–80 | 40–75 |
| Liquid velocity, ft/sec. through recirculation line | 10–40 | 15–35 |
| Reynolds No. ($n_{Re}$) through vertical pipe entering mixing vessel | $\geq$1500 | $\geq$3000 |
| Separator | | |
| Skimmer tip speed, ft/min | 1–10 | 1–4 |
| Retention time, min | 15–120 | 60–120 |
| Feed rate, lb/(hr)(ft$^2$ of separator surface area) | $\leq$250 | 125–175 |
| Temperature, °F. | 100–180 | 125–150 |
| Overflow ("tops" containing carbonaceous material) | | |
| Recovery, % of input liquid | $\geq$5 | 5–15 |
| Grade | 8-24-0 to 11-37-0 | 10-34-0 to 11-37-0 |
| Polyphosphate level, % of total P$_2$O$_5$ | 45–90 | 50–80 |
| Underflow (clarified liquid) | | |
| Recovery, % of input liquid | $\leq$95 | 85–95 |
| Grade | 8-24-0 to 11-37-0 | 10-34-0 to 11-37-0 |
| Polyphosphate level, % of total P$_2$O$_5$ | 45–90 | 50–80 |
| pH | 5.5–7.0 | 6.0–6.6 |
| Filter | | |
| Admix in feed to filter | | |
| Water, lb/lb "tops" | 1–11 | 1–8 |
| Filter aid, % by wt | 0.1–1.0 | 0.1–0.2 |
| Precoat, lb filter aid/100 ft$^2$ filter area | 2–20 | 10–15 |
| Filtrate (feed to liquid reactor) | | |
| Grade | 0.7-2-0 to 4-13-0 | 1-4-0 to 4-13-0 |
| Polyphosphate level, % of total P$_2$O$_5$ | 45–90 | 50–80 |

$^a$In the process, anhydrous ammonia, liquid fertilizer from the filter isfed to the liquid reactor with either molten ammonium polyphosphate or superphosphoric acid.
$^b$Either a primary amine or an acetic acid salt of a primary amine is added in combination with the quaternary ammonium chloride. When one or the other is added in combination with the chloride, the amount of the one not added will be zero. In either instance, the minimum amount of primary amine or acetic acid salt added is 0.1 lb per ton liquid fertilizer.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In an improved process for preparing clarified ammonium polyphosphate fertilizer solutions wherein:
   (a) a stream of ammonium polyphosphate melt, prepared from black wet-process phosphoric acid and ammonia, is introduced into liquid fertilizer dissolution means for dissolving said melt in a stream of water of formulation, said water of formulation supplied from a later-mentioned filtrate recovery step, and a stream of supplemental ammonia;
   (b) the resulting liquid fertilizer solution is subsequently transferred and admixed with relatively small predetermined quantities of flocculant in first mixing means for mixing said fertilizer solution with said flocculant;
   (c) the resulting mixture of said liquid fertilizer solution and said flocculant is agitated;
   (d) the resulting agitated mixture of said liquid fertilizer solution and said flocculant is subsequently transferred to separating means for separating said mixture into an upper and a lower layer, said upper layer containing tops, said tops comprising said flocculant, the black carbonaceous material congeneric with said black wet-process phosphoric acid effecting the production of said melt and residual $P_2O_5$ values derived from said liquid fertilizer solution, and said lower layer containing a relatively clear ammonium polyphosphate fertilizer solution having substantial amounts of the input $P_2O_5$ values;
   (e) said lower layer of said clarified ammonium polyphosphate solution is subsequently removed to storage from said separating means for separating said upper and lower layers;
the improvement, for both effecting clarification of additional quantities of said black ammonium polyphosphate fertilizer solution produced in said fertilizer dissolution means for dissolving said melt, and for eminently improving the recovery of said residual $P_2O_5$ values in said tops, which comprises the steps of:
   (1) removing said tops from said separating means for separating said upper layer from said lower layer, and introducing same, together with a stream of predetermined amounts of filter aid and water, into second mixing means for mixing said removed tops, said filter aid, and said water, said predetermined quantities of water sufficient such that the ratio of pounds water per pound of tops introduced and mixed in said second mixing means for mixing said tops, filter aid, and water ranges from 1 to 11;
   (2) agitating the resulting mixture in said second mixing means for mixing said tops, filter aid, and water;
   (3) transferring the resulting agitated mixture in said mixing means for mixing said tops, filter aid and water to filtering means for filtering said resulting agitated mixture;
   (4) removing the resulting filter cake to storage from said filtering means for filtering said resulting agitated mixture;
   (5) recovering filtrate from said filtering means for filtering said agitated mixture; and
   (6) introducing said filtrate recovered in step 5 above into said liquid fertilizer dissolution means for dissolving said melt, as said stream of water of formulation;
said improved process characterized by the fact that greater than about 99 percent of the total $P_2O_5$ values in the ammonium polyphosphate values fed to said process are recovered in said ammonium polyphosphate fertilizer solution product.

2. In an improved process for preparing clarified ammonium polyphosphate fertilizer solutions wherein:
   (a) a stream of ammonium polyphosphate melt, prepared from black wet-process phosphoric acid and ammonia is introduced into liquid fertilizer dissolution means for dissolving said melt in a stream of water of formulation, said water of formulation supplied from a later-mentioned filtrate recovery step, and a stream of supplemental ammonia;
   (b) the resulting liquid fertilizer solution is subsequently transferred and admixed with relatively small predetermined quantities of flocculant in first mixing means for mixing said fertilizer solution with said flocculant;
   (c) the resulting mixture of said liquid fertilizer solution and said flocculant is agitated;
   (d) the resulting agitated mixture of said liquid fertilizer solution and said flocculant is subsequently transferred to separating means for separating said mixture into an upper and a lower layer, said upper layer containing tops, said tops comprising said flocculant, the black carbonaceous material congeneric with said black wet-process phosphoric acid effecting the production of said melt, and from about 5 to about 15 percent of residual $P_2O_5$ values derived from said liquid fertilizer solution and said lower layer containing a relatively clear ammonium polyphosphate fertilizer solution having from about 85 to about 95 percent of the input $P_2O_5$ value;
   (e) said lower layer of said clarified ammonium polyphosphate solution is subsequently removed to storage from said separating means for separating said upper and lower layers;
the improvement, for both effecting clarification of additional quantities of said black ammonium polyphosphate fertilizer solution produced in said fertilizer dissolution means for dissolving said melt, and for eminently improving the recovery of said residual $P_2O_5$ values in said tops, which comprises the steps of:
   (1) removing said tops from said separating means for separating said upper layer from said lower layer, and introducing same, together with a stream of predetermined amounts of filter aid and water, into second mixing means for mixing said removed tops, said filter aid, and said water, said predetermined quantities of water sufficient such that the ratio of pounds water per pound of tops introduced and mixed in said second mixing means for mixing said tops, filter aid, and water ranges from 1 to 11;
   (2) agitating the resulting mixture in said second mixing means for mixing said tops, filter aid, and water;
   (3) transferring the resulting agitated mixture in said mixing means for mixing said tops, filter aid and water to filtering means for filtering said resulting agitated mixture;

(4) removing the resulting filter cake to storage from said filtering means for filtering said resulting agitated mixture;

(5) recovering filtrate from said filtering means for filtering said agitated mixture; and (6) introducing said filtrate recovered in step 5 above into said liquid fertilizer dissolution means for dissolving said melt, as said stream of water of formulation;

said improved process characterized by the fact that greater than about 99 percent of the total $P_2O_5$ values in the ammonium polyphosphate values fed to said process are recovered in said ammonium polyphosphate fertilizer solution product.

3. The process of claim 1 or claim 2 in which said ammoniated polyphosphate solution has a pH range from about 5.5 to about 6.5 and contains from about 10 to about 90 percent by weight of the total $P_2O_5$ as non-orthophosphate.

4. The process of claim 1 or claim 2 in which said ammonium polyphosphate solution ranges from about 8-24-0 to about 11-37-0.

5. The process of claim 1 or claim 2 wherein the ratio of pounds of water per pound of tops in said second mixing means for mixing said removed tops, filter aid, and water ranges from 1 to 8.

* * * * *